(12) United States Patent
Tadano et al.

(10) Patent No.: US 6,822,209 B2
(45) Date of Patent: Nov. 23, 2004

(54) FOCAL POINT DISLOCATION DETECTING METHOD AND OPTICAL PICKUP APPARATUS

(75) Inventors: Hiroyuki Tadano, Kitakatsuragi-gun (JP); Ikuo Nakano, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 247 days.

(21) Appl. No.: 09/990,797

(22) Filed: Nov. 14, 2001

(65) Prior Publication Data
US 2002/0056802 A1 May 16, 2002

(30) Foreign Application Priority Data
Nov. 15, 2000 (JP) ........................................ 2000-348684

(51) Int. Cl.[7] .............................. G02B 27/40; G11B 7/00
(52) U.S. Cl. ............................... 250/201.5; 369/44.23; 369/112.1
(58) Field of Search ..................... 250/201.2, 201.4, 250/201.5; 369/44.14, 44.22, 44.23, 44.32, 112.04, 112.07, 112.1, 112.11, 112.12

(56) References Cited

U.S. PATENT DOCUMENTS 6,320,699 B1 * 11/2001 Maeda et al. ............... 359/637
6,339,562 B1 * 1/2002 Sakai ....................... 369/44.23
6,498,330 B1   12/2002 Yoshida ................... 250/201.5

FOREIGN PATENT DOCUMENTS

| JP | 60-083229 | 5/1985 |
| JP | 2000-155979 | 6/2000 |
| JP | 2000-171376 | 6/2000 |
| JP | 2001-307349 | 11/2001 |

* cited by examiner

*Primary Examiner*—Kevin Pyo
(74) *Attorney, Agent, or Firm*—David G. Conlin; William J. Daley, Jr.; Edwards & Angell, LLP

(57) ABSTRACT

The focal point detection method detects focal point dislocation of a coupling objective lens in accordance with a light beam passing a 60% to 80% region of a light beam effective diameter, which is centered with respect to an optical axis OZ of a light beam passing through the coupling objective lens, and which is regulated by a numerical aperture of the coupling objective lens. In this manner, focal point dislocation of a converging optical system can be performed without an offset, thereby accurately forming a focal point of the converging optical system on an information recording layer of an optical recording medium.

17 Claims, 10 Drawing Sheets

F I G. 5 (a)
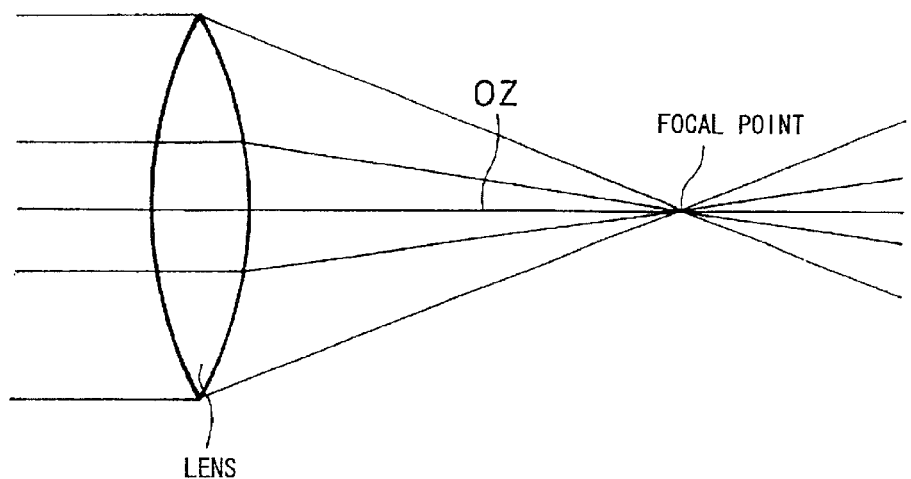
F I G. 5 (b)
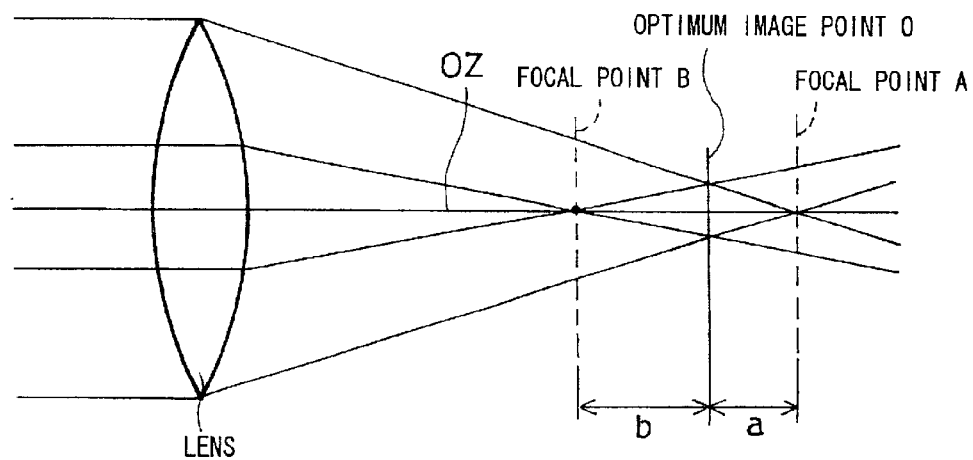

ically a different spherical aberration, which has been generated when the light beam passes the cover glass of the optical disc. In this case, for example, a difference (error ΔSA) between the spherical aberration generated in the information recording layers adjoining each other is proportional to a layer-to-layer space t between the adjacent information recording layers, according to the equation (1).

FOCAL POINT DISLOCATION DETECTING METHOD AND OPTICAL PICKUP APPARATUS

FIELD OF THE INVENTION

The present invention relates to a focal point dislocation detection method of detecting a focal point dislocation generated in a converging optical system, and to an optical pickup apparatus in which the focal point dislocation detection method is employed.

BACKGROUND OF THE INVENTION

Recently, there is a demand for an optical disc having a high recording density, in response to an increase in an amount of information. The high recording density of the optical disc has been achieved by increasing linear recording density in an information recording layer of the optical disc or by narrowing a track pitch of the optical disc. In response to the trend for the high recording density of the optical disc, it is necessary to have a small beam diameter of a light beam that is converged on the information recording layer of the optical disc.

In order to make the beam diameter of the light beam small, (a) the light beam, which is directed from an objective lens (a converging optical system of a light pickup apparatus for recording/reproducing the optical disc), has a high numerical aperture (NA), or (b) the light beam has a short wave length.

As to the short wave length of the light beam, it is believed that the short wave length of the light beam can be realized by using, as a light source, a bluish purple semiconductor laser, which has been developed paving the way for its commercial use, instead of a red semiconductor laser.

On the other hand, in order to realize the objective lens having the high numerical aperture, suggested is a method in which an objective lens is coupled with a semispherical lens so as to constitute an objective lens with the two lenses (a couple of lenses), thereby increasing the high numerical aperture.

In general, the information recording layer of the optical disc is covered with a cover glass so that the information recording layer can be protected from being attached by a dust or being damaged. Therefore, a light beam that has passed through the objective lens of the optical pickup apparatus passes through the cover glass, then is converged to make a focal point on the information recording layer that is underneath the cover glass.

When the light beam passes the cover glass, spherical aberration (SA) is generated. The spherical aberration is obtained by an equation (1) as follows:

$$SA \propto d \cdot NA^4 \quad (1).$$

As indicated by the equation (1), the spherical aberration is proportional to a thickness of the cover glass d, and the fourth power of NA. Because the objective lens is usually so designed to compensate the spherical aberration, the light beams that has passed through the objective lens and the cover glass, has a sufficiently small spherical aberration.

However, if the cover glass has a thickness that is different from a predetermined thickness, the spherical aberration is generated in the light beam converged on the information recording layer, thereby enlarging its beam diameter, causing such a problem that correct reading and writing of the information are impossible.

Moreover, the equation (1) indicates that a larger error Δd of the thickness of the cover glass gives a larger error ΔSA of the spherical aberration, thereby making it impossible to read and write the information correctly.

Furthermore, a multilayer optical disc, in which the information recording layers are laminated, has been developed for a commercial use, so as to record the information in a still higher density in terms of a thickness direction of the optical disc. For example, a DVD (Digital Versatile Disc) having two information recording layers has been developed as the multilayer optical disc. For an optical pickup apparatus for recording/reproducing the multilayer optical disc, it is necessary that the light beam is converged sufficiently small for each information recording layer of the optical disc.

For the multilayer optical disc having the plural information recording layers, thicknesses from a surface of the optical disc (surface of the cover glass) to the respective information recording layers are different from each other. Because of this, each information recording layer has respectively a different spherical aberration, which has been generated when the light beam passes the cover glass of the optical disc. In this case, for example, a difference (error ΔSA) between the spherical aberration generated in the information recording layers adjoining each other is proportional to a layer-to-layer space t between the adjacent information recording layers, according to the equation (1).

For the DVD having the two information recording layers, used is an optical pickup apparatus that has an objective lens NA of which is as small as 0.6. Because of this, in the DVD having the two information recording layers, the error Δd of the thickness of the cover glass does not largely affect the error of the spherical aberration ΔSA, even though the error Δd of the thickness of the cover glass becomes large to some extent, according to the equation (1).

Therefore, with a DVD apparatus provided with the conventional optical pickup apparatus having the numerical aperture NA of about 0.6, it is possible to converge the light beam sufficiently small on each information recording layer, because the error ΔSA of the spherical aberration, which is generated due to the error Δd of the thickness of the cover glass of the DVD, is small.

However, even if the error Δd of the thickness of the cover glass is constant, the greater the NA is, the larger spherical aberration SA is generated. For example, when NA=0.85, an approximately four-time larger spherical aberration SA is generated, compared with the case where NA=0.6. Therefore, the equation (1) shows that the respective spherical aberration due to the error in the thickness of the cover glass becomes larger as the NA becomes higher, for example, when NA=8.5.

Similarly, in case of the multilayer optical disc, the spherical aberration have a greater differences (error ΔSA) as the objective lens of the optical pickup apparatus has a larger NA, even if the layer-to-layer distance t between the adjacent information recording layers is constant. For example, when NA=0.85, a approximately four-time larger difference is generated between the spherical aberration SA, compared with the case where NA =0.6. Therefore, according to the equation (1), it is indicated that the difference between the respective spherical aberration between the respective information layers gets greater as the NA becomes higher, for example, when NA=8.5.

Thus, it is a problem for an objective lens having a high NA, which is inevitably affected by the error of the spherical aberration, that the information is read in a low accuracy. Thus, it is necessary to compensate for the spherical aberration in order to realize the high recording density by using the objective lens of the high NA.

As a method for detecting and compensating the spherical aberration, for example, the U.S. patent application, Ser. No. 09/456,414 (filed on Dec. 8, 1999) discloses an optical pickup apparatus for detecting and compensating the spherical aberration. The optical pickup apparatus takes advantages of a feature that the light beam in the vicinity of an optical axis is converged in a different position from a position where the light beam outside the vicinity of the optical axis is converged, in accordance with the spherical aberration, when the light beam is converged on the information recording layer of the optical disc.

The optical pickup apparatus disclosed in the publication, in which an optical element such as a hologram is used to separate a light beam, which is to be detected, into the light beam in the vicinity of the optical axis and the light beam outside the vicinity of the optical axis so as to detect the dislocation of the convergence of one of the light beams, when the spherical aberration is generated, the convergence of which is dislocated from the information recording layer. With the optical pickup apparatus, the spherical aberration can be compensated in accordance with a result of the detection, so as to sufficiently reduce the diameter of the light beam converged on each information recording layer of the optical disc.

Moreover, the optical pickup apparatus performs focal point positional adjustment of the optical system, for example, by halving the light beam in halves by means of the hologram and the like, so as to converge the half parts of the light beam on a two-splitting photodetector. Then, the optical pickup apparatus detects, as a signal regarding the focal point dislocation (focal error signal), a difference generated by the two-splitting photodetector so as to compensate the focal point dislocation in accordance with the signal. In general, this method is called as a beam-size method.

However, in case the optical pickup apparatus disclosed in the publication is adopted in an optical recording/reproducing apparatus in which the lens having the high NA or the light source for the light beam having the short wave length are used in order to achieve the high recording density, the spherical aberration causes an offset in the focal error signal that has been detected as above. Therefore, the diameter of the light beam cannot be sufficiently small on the information recording layer of the optical recording medium (disc), thereby causing such a problem that the information cannot be recorded/reproduced to/from the optical recording medium.

SUMMARY OF THE INVENTION

The present invention has an object to provide a focal point dislocation (focus error) detection method for detecting focal point dislocation in a converging optical system without an offset, so as to perform accurate focusing of the converging optical system onto an information recording layer of an optical recording medium, and an optical pickup apparatus using the focal point dislocation detection method.

In order to attain the above object, a focal point dislocation detection method of the present invention includes the step of detecting focal point dislocation of a converging optical system in accordance with, among light beams that has passed through the converging optical system, a light beam that corresponds to an extreme value of a curve and a region in a vicinity of the extreme value, where the curve represents a wavefront of such a state that the converging optical system is so adjusted to have an image point at which the light beam has a smallest beam diameter.

Here, when illustrated by a curve line is the wavefront of the state where the converging optical system is adjusted to have an image point (an optimum image point) having the smallest beam diameter of the light beam, the curve line have a tangent line that is approximately parallel to a tangent line of a curve line at an extreme value, where the curve line at the extreme value represents an ideal wavefront free from the spherical aberration. This indicates that a convergent point (focal point) and the optimum image point are located in an almost same position. Here, the convergent point is a point on which the light beam, which passes through the extreme value of the curve line that represents the wavefront of the case where the light beam has the optimum image point on the information recording layer of the optical recording medium.

Therefore, where the wavefront of a state where the light beam, which passes through the converging optical system, has the optimum image point, the focal point dislocation of the converging optical system can be accurately detected, without being largely affected by the spherical aberration, by performing the detection in accordance with the light beam that corresponds to the extreme value of the curve and a vicinity of the extreme value, even if the spherical aberration is generated in the converging optical system.

Because this makes it possible to optically detect the focal point dislocation of the converging optical system without the offset, it is possible to appropriately compensate for the focal point dislocation of the converging optical system. As a result, it is possible to accurately focus to have the focal point of the converging optical system of the information recording layer of the optical recording medium.

Moreover, another focal point dislocation detection method of the present invention includes the step of detecting focal point dislocation of a converging optical system in accordance with a light beam of a 60% to 85% region of a light beam effective diameter, where the light beam effective diameter, which is centered with respect to an optical axis of the light beam passing through the converging optical system including an objective lens, is regulated by a an aperture diameter of the objective lens.

Here, an optimum image point of the light beam, which passes through the converging optical system, approximately matches with a converging point (focal point) at which the light beam of the 60% to 85% region of the light beam effective diameter, which is centered with respect to an optical axis of the light beam passing through the converging optical system including an objective lens, is regulated by an aperture diameter of the objective lens.

Therefore, even if the spherical aberration is generated, it is possible to accurately detect the focal point dislocation without being significantly affect by the spherical aberration, with the above arrangement where the focal point dislocation of a converging optical system is detected in accordance with a light beam of a 60% to 85% region of a light beam effective diameter, where the light beam effective diameter, which is centered with respect to an optical axis of the light beam passing through the converging optical system including an objective lens, is regulated by a an aperture diameter of the objective lens.

Therefore, even if the spherical aberration is generated, it is possible to accurately detect the focal point dislocation without being significantly affect by the spherical aberration, with the above arrangement where the focal point dislocation of a converging optical system is detected in accordance with a light beam of a 60% to 85% region of a light beam effective diameter, where the light beam effective diameter, which is centered with respect to an optical axis of the light beam passing through the converging optical system including an objective lens, is regulated by a numerical aperture of the objective lens.

Because the focal point dislocation of the converging optical system can be optically detected without an offset, the focal point dislocation of the converging optical system may be appropriately compensated. As a result, the focal point of the converging optical system can form a focal point accurately on the information recording layer of the optical recording medium.

For a fuller understanding of the nature and advantages of the invention, reference should be made to the ensuing detailed description taken in conjunction with the accompanying drawings.

BRIEF DESCRIPTION OF THE DRAWINGS

FIG. 5a is an explanatory view showing a focal point position of a light beam in a lens having no spherical aberration.

FIG. 5b is an explanatory view showing a focal point position of a light beam in a lens having the spherical aberration.

DESCRIPTION OF THE EMBODIMENTS

Explained below is an embodiment of the present invention. It should be noted that the present embodiment explains a case where a focal point dislocation detecting method of the present invention is adopted in an optical pickup apparatus that is mounted in an optical recording/reproducing apparatus for optically recording and reproducing information to an optical disc as a optical recording medium.

Figure 2:
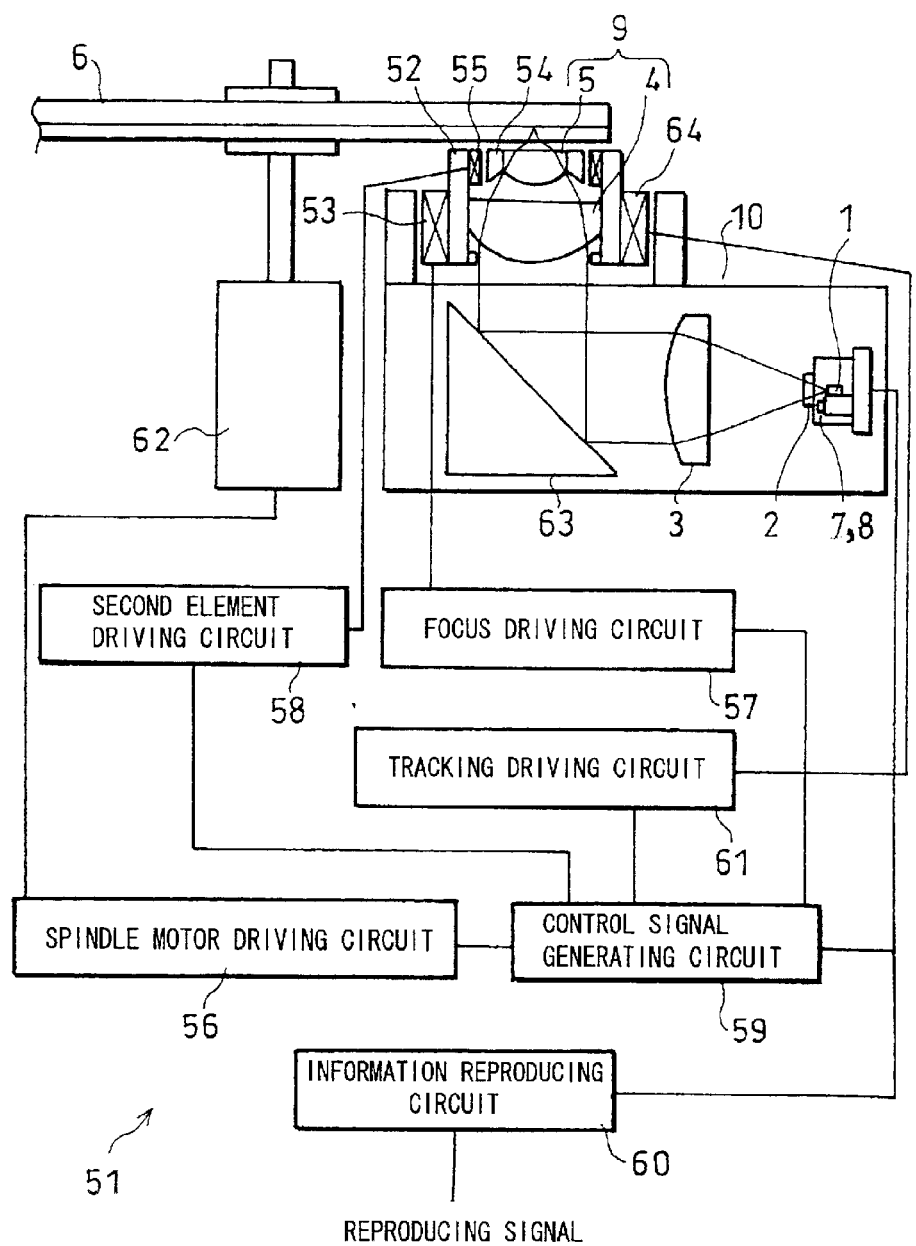
FIG. 2 is a schematic diagram of an optical recording/reproducing apparatus provided with the optical pickup apparatus shown in FIG. 1.

The optical recording/reproducing apparatus of the present embodiment, as shown in FIG. 2, is provided with a spindle motor 62, an optical pickup apparatus 10, and a driving control section 51. The spindle motor 62 rotates an optical disc 6, which is an optical recording medium. The optical pickup apparatus 10 records and reproduces information with respect to the optical disc 6. The driving control section 51 is for driving and controlling the spindle motor 62 and the optical pickup apparatus 10.

The optical pickup apparatus 10 is provided with a semiconductor laser 1, a hologram 2, a collimator lens 3, a coupling objective lens 9, which is a converging optical system, and detectors 7 and 8. The semiconductor laser 1 is a light source for projecting a light beam onto the optical disc 6.

Moreover, provided between the coupling objective lens 9 and the collimator lens 3 is a mirror 63 for refracting a light path of a light beam at a 90°, where the light beam is from the coupling objective lens 9 or from the collimator lens 3.

Furthermore, the coupling objective lens 9 is provided with a first lens element 4 and a second lens element 5 that are arranged in this order with respect to a light-beam projecting side of the semiconductor laser 1.

The first lens element 4 is supported by a holder 52 that holds a periphery section of the first lens element 4. The holder 52 has an outer periphery section in which a focus actuator 53 and a tracking actuator 64 are provided.

The focus actuator 53 controls focusing by moving the coupling objective lens 9 to an appropriate position in an optical axis direction. Moreover, the tracking actuator 64 moves the coupling objective lens 9 in a radial direction (a direction crossing at a right angle a directing of a track formed on the optical disc 6, and a direction of the optical axis direction) for performing tracking control.

Accurate driving and control of the tracking actuator 64 allow the light beam to correctly trace on an information track of the optical disc 6.

Moreover, the second lens element 5 is supported by a holder 54 that holds a periphery section of the second lens element 5. The holder 52 has an inner periphery section, which faces an outer periphery section of the holder 54. In the inner periphery section of the holder 52, a second element actuator 55 is provided. The second element actuator 55 moves the second lens element 5 in the optical axis direction. By driving and controlling the second element actuator 55, a distance between the first lens element 4 and the second lens element 5, so as to compensate spherical aberration that is generated in the optical system of the optical pickup apparatus 10.

The driving control section 51 is provided with a spindle motor driving circuit 56, a focus driving circuit 57, a tracking driving circuit 61, and a second element driving circuit 58. The spindle motor driving circuit 56 drives and controls the spindle motor 62. The focus driving circuit 57 drives and controls the focus actuator 53. The tracking driving circuit 61 drives and controls the tracking actuator 64. The second element driving circuit 58 drives and controls the second element actuator 55. The driving control section 51 is further provided with (a) a control signal generating circuit 59 that generates a control signal, from the signals obtained from the detectors 7 and 8, where the thus generated control signal is for each control circuits, and (b) an information reproducing circuit 60 for reproducing the information recorded in the optical disc 6 from the signal obtained from the detectors 7 and 8, so as to generate a reproducing signal.

The control signal generating circuit 59 generates a tracking error signal, a focus error signal FES, and a spherical aberration error signal SAES, in accordance with the signal obtained from the detectors 7 and 8, so as to output the tracking error signal to the tracking driving circuit 61, the focus error signal FES to the focus driving circuit 57, and the spherical aberration error signal SAES to the second element driving circuit 58. Then, the respective driving circuits drive and control the respective sections respectively in accordance with the respective error signals.

For example, on receipt of the focus error signal FES, the focus driving circuit 57 moves the coupling objective lens 9 in the optical axis direction, in accordance with a value of the focus error signal FES, so as to drive and control the focus actuator 53 to compensate focal point dislocation of the coupling objective lens 9.

Moreover, the second element driving circuit 58, on the receipt of the spherical aberration error signal SAES, moves the second lens element 5 in the optical axis direction, in accordance with the spherical aberration error signal SAES. Then, the second element driving circuit 58 drives and controls the second element actuator 55 so as to compensate spherical aberration generated in an optical system of the optical pickup apparatus 10. However, in case a spherical aberration compensation system is used for compensating the spherical aberration, fixed us a distance between the first lens element 4 and the second lens element 5 of the coupling objective lens, so that the spherical aberration is compensated in accordance with a value of the spherical aberration error signal SAES inputted into the spherical aberration compensation system.

Figure 1:
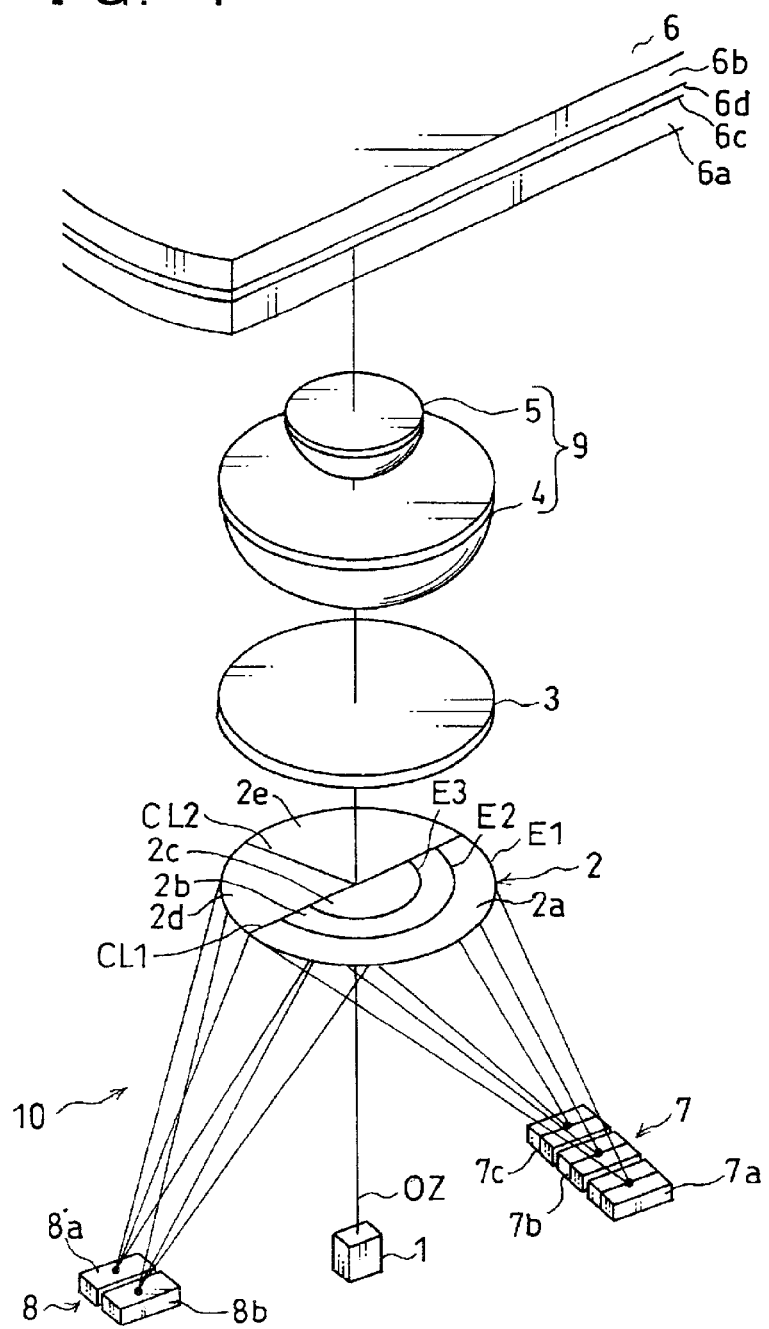
FIG. 1 is a schematic diagram of an optical pickup apparatus of the present invention.

Here, provided is a detailed explanation of the optical pickup apparatus 10, with reference to FIG. 1. Note that, for convenience of explanation, the mirror 63, which is shown in FIG. 2, is omitted from the optical pickup apparatus 10 shown in FIG. 1.

In the optical pickup apparatus 10, the hologram 2, the collimator lens 3, the first and second lens elements 4 and 5, which constitute the coupling objective lens 9, are located along an optical axis OZ formed between (a) a light beam projecting surface of the semiconductor 1 and (b) a light beam reflecting surface of the optical disc. In addition, each of the detectors 7 and 8 is located in a position where diffracted light of the hologram 2 has a focal point.

More specifically, in the optical pickup apparatus 10 having the above arrangement, the light beam emitted from the semiconductor laser 1 passes through the hologram 2 as zero order diffracted light, then is converted into parallel light by the collimator lens 3. Thereafter, the light beam, which has been converted to be the parallel light, passes through the coupling objective lens 9 composed of the two lens, namely the first and second lens elements 4 and 5. Then, the light beam is converged on an information recording layer 6c or 6d on the optical disc 6.

On the other hand, a light beam, which has been reflected from the information recording layer 6c or 6d of the optical disc 6, passes through the coupling objective lens 9 composed of the second and first lenses elements 5 and 4, the collimator lens 3 in this order, so as to be directed to the hologram 2. Then, the light beam is diffracted by the hologram 2, and is converged on the detectors 7 and 8.

The detector 7 is provided with a first light-receiving section 7a, a second light-receiving section 7b, and a third light-receiving section 7c, while the detector 8 is provided with a fourth light-receiving section 8a and a fifth light-receiving section 8b so that the converged light beam is converted into an electric signal by the detectors 7 and 8.

The optical disc 6 is provided with a cover glass 6a, a substrate 6b, and the two information recording layers 6c and 6d, which are formed between a cover glass 6a and the substrate 6b. In short, the optical disc 6 is a two-layered disc. Thus, the present optical pickup apparatus 10 converges the light beam on the information recording layer 6c or 6d, so as to reproduce the information from the information recording layer 6c or 6d, or record the information in the information recording layer 6c or 6d.

Therefore, in the following explanation, the information recording layer of the optical disc 6 represents one of the information recording layers 6c and 6d. Thus, the optical pickup apparatus 10 can converge the light beam on any of the information recording layers 6c and 6d arbitrarily, so as to record or reproduce the information.

The hologram 2 is composed of five regions 2a, 2b, 2c, 2d, and 2e (light separating region).

The first region 2a is a region surrounded by a first straight line CL1, which makes a right angle with the optical axis OZ, a first circle E1 and a second circular arc E2 whose centers are the optical axis OZ.

The second region 2b is a region surrounded by the first straight line CL1, the second circular arc E2, and a third circular arc E3 whose center is the optical axis OZ.

The third region 2c is a region surrounded by the first straight line CL1 and the third circular arc E3.

The fourth region 2d is a region surrounded by the first straight line CL1, the first circle E1 and a second straight line CL2 that crosses with the optical axis OZ and the first straight line CL1 at a right angle. The fifth region 2e is, similarly to the fourth region 2d, a region surrounded by the first straight line CL1, the second straight line CL2 and the first circle E1.

The hologram 2 lets light projected from the semiconductor laser 1 to pass through the hologram 2, thereby directing the light as the zero order diffracted light to a side where the optical disc 6 is located. Meanwhile, the hologram 2 diffracts light reflected from the side where the optical disc 6 is located, so that the reflected light is directed to the detectors 7 and 8.

The hologram 2 is so formed as to diffract the light beams passing through the hologram 2 from the side where the optical disc 6 is located, so that the light beams are converged in different points in the respective regions. More specifically, among the light beams reflected by the information recording layer of the optical disc 6, a first light beam diffracted in the first region 2a of the hologram 2 forms a converging spot in the first light-receiving section 7a, while a second light beam that is diffracted in the second region 2b of the hologram 2 forms a converging spot in the second light-receiving section 7b. Moreover, a third light beam diffracted in the third region 2c of the hologram 2 forms a converging spot in the third light-receiving second 7c, while a fourth light beam that is diffracted in the fourth region 2d of the hologram 2 forms a converging spot in the fourth light-receiving section 8a. Further, a fifth light beam diffracted in the fifth region 2e of the hologram 2 forms a converging spot in the fifth light-receiving section 8b.

Here, provided in the following is a detailed explanation on the detectors 7 and 8, with reference to FIG. 3.

Figure 3:
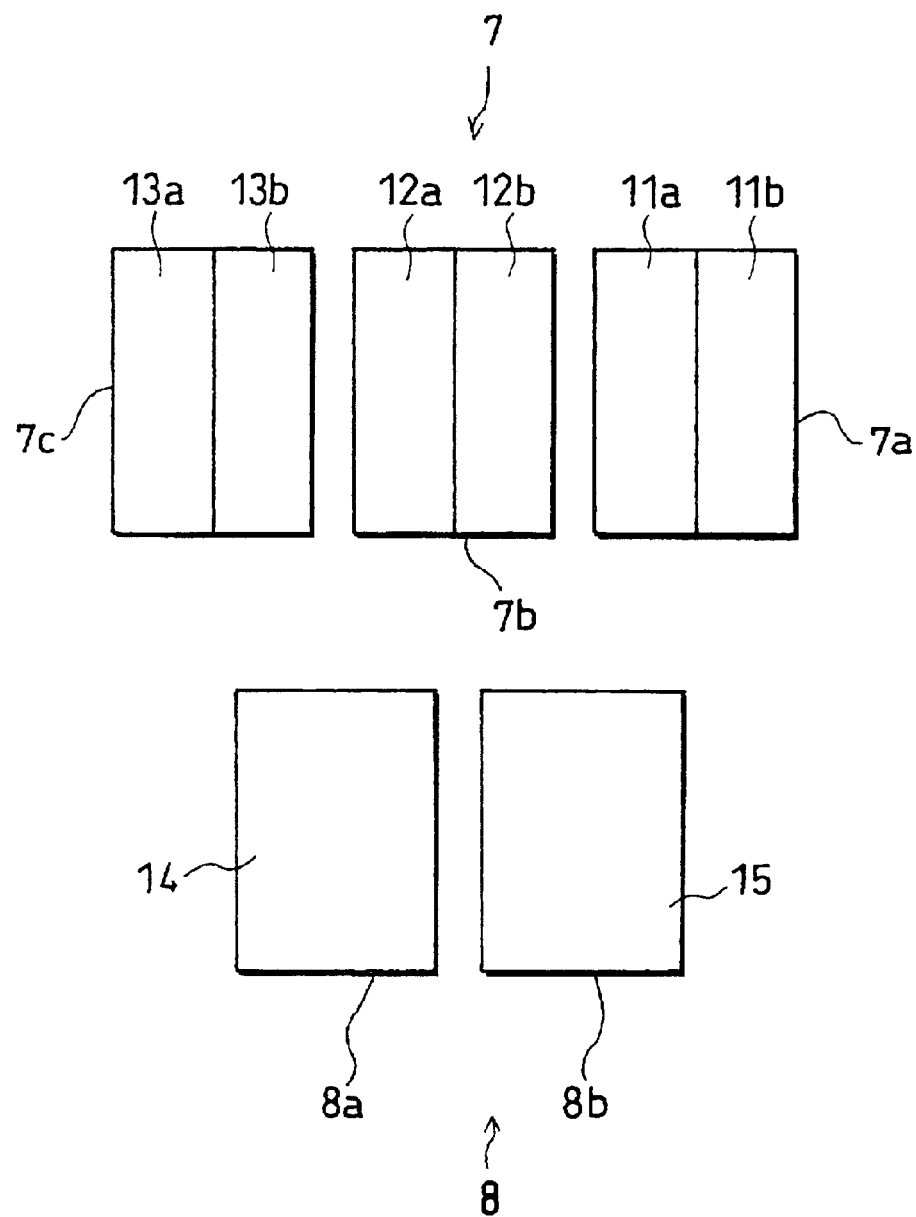
FIG. 3 is an explanatory view illustrating in detail a detector of the optical pickup apparatus shown in FIG. 1.

As shown in FIG. 3, the detector 7 is provided with the three light-receiving sections (the first light-receiving section 7a, the second light-receiving section 7b, and the third light receiving section 7c), which are arranged along a line, while the detector 8 is provided with the two light-receiving sections (the fourth light-receiving section 8a and the fifth lightreceiving section 8b), which are arranged in series.

The first light-receiving section 7a, the second light-receiving section 7b, and the third light receiving section 7c are respectively provided with photodetectors 11a and 11b, 12a and 12b, or 13a and 13b, which are respectively divided into two. The respective light-receiving sections are so located that the converging light spots of the first, second, and third light beams are formed on each line which respectively divides the photodetectors. The respective light-receiving sections convert the light beams into electric signals.

The fourth light-receiving section 8a and the fifth light-receiving section 8b are respectively provided with one photodetector 14 or 15, so as to convert the fourth or fifth light beam into the electric signal.

The electric signals obtained by the respective photodetectors are used by the driving control section 51 (shown in FIG. 2) so as to carry out the compensation of the focal point dislocation of the coupling objective lens 9 and the reproduction of the information in the optical disc 6. For example, the electric signal is outputted to the information reproduction circuit 60 (shown in FIG. 2) so as to be converted into a reproducing signal RF. Here, the reproducing signal RF which is stored in the optical disc 6, is obtained by summing up the electric signals outputted from the respective photodetectors.

The thus arranged optical recording/reproducing apparatus carries out tracking driving control so that the light beam that is directed from the coupling objective lens 9 can be converged on the track formed the optical disc 6. In short, the tracking actuator 64 (shown in FIG. 2) is driven so as to move the coupling objective lens 9 in the radial direction (radius direction) of the optical disc 6, thereby converging the light beam on the track.

Here, a tracking error signal TES, which indicates how much the light beam is dislocated from the track in the radial direction, satisfies an equation (2), using electric signals 14S and 15S, which are outputted from the photodetectors 14 and 15:

$$TES = 14S - 15S \quad (2).$$

By using the equation (2), the tracking error signal TES is obtained. This method for measuring tracking errors utilizes such a phenomenon that a reflected diffracted light pattern is unbalanced with respect to the radial direction in accordance with a positional relationship between the track and the converting spot. Thus, this method for measuring the tacking errors is called a push-pull method. Therefore, with a view of measuring an amount of the unbalance, it is preferable that the straight line CL2, which divides the fourth region 2d and the fifth region 2e of the hologram 2, falls at a right angle with the radial direction.

The compensation of the focal point dislocation of the coupling objective lens 9 is carried out by using the electric signals from the respective photodetectors.

When the focal point is not located on the information recording layer, the light beam is directed unevenly onto the light-receiving sections of the detector 7, namely, the first light-receiving section 7a, the second light-receiving section 7b, and the third light receiving section 7c, that is, one of the light receiving sections receives more of the light beam, while the rest receive less. Therefore, a first focus error signal F1 is obtained by an equation (3):

$$F1 = 11aS - 11bS \quad (3),$$

where 11aS and 11bS are the electric signals from the photodetectors 11a and 11b that convert the diffracted light from the first region 2a of the hologram 2 into the electric signals. Meanwhile, a second focus error signal F2 is given by an equation (4):

$$F2 = 12aS - 12bS \quad (4)$$

where 12aS and 12bS are the electric signals from the photodetectors 12a and 12b that convert the diffracted light from the second region 2b of the hologram 2 into the electric signals. A third focal error signal F3 is determined by an equation (5):

$$F3 = 13aS - 13bS \quad (5)$$

where 13aS and 13bS are the electric signals from the detectors 13a and 13b that convert the diffracted light from the third region 2c of the hologram 2 into the electric signals. Here, in the case the focal point is not located on the information layer, output values of the respective focus error signals F1, F2 and F3 represent an amount of the focal point dislocation.

Therefore, in order that the focal point is always located on the information recording layer, the coupling objective lens 9 may be moved in the optical axis direction OZ in such a manner that one of the focus error signals F1, F2 and F3 has an output value of zero all times.

The method for detecting the focal point dislocation as discussed above is generally called a knife-edge method. Here, the focal point dislocation represents an amount of a distance between (a) the focal point at which the light beam, which passes the coupling objective lens 9 from a side where the semiconductor laser 1 is located, is converged, and (b) the position of the information recording layer of the optical disc 6.

Usually, the detection of the focus error signal FES is carried out by utilizing the whole region of the light beam effective diameter. Therefore, the focus error signal FES is generated, satisfying the following equation:

$$FES = F1 + F2 + F3 \quad (6).$$

However, in this case, the following problem is posed.

Figure 4:
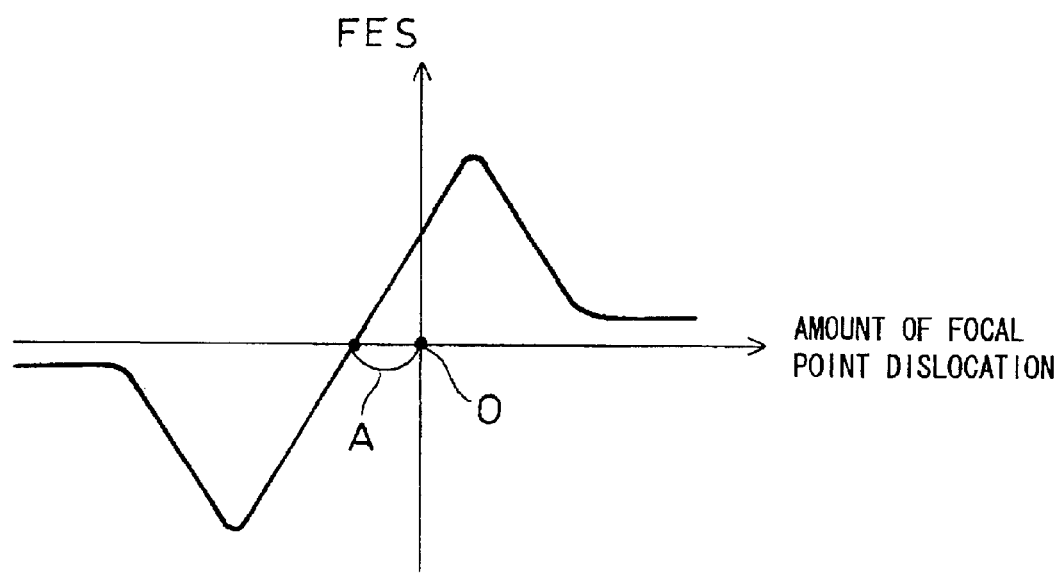
FIG. 4 is a graph illustrating a relationship between a focus error signal FES and an amount of a focal point dislocation when a converging optical system has spherical aberration.

In the coupling objective lens 9, which is the converging optical system, the spherical aberration is caused, for example, due to a change in the thickness of the cover glass 6a of the optical disc 6. In this case, the detection of the focal point dislocation is carried out, while an offset A, as shown in FIG. 4, is generated in the focus error signal FES. Therefore, even if the detected focus error signal FES has the output value of zero, the light beam does not match with an optimum image point O on the information recording layer, thereby making it impossible to carry out the recording/reproducing of the information. Here, the optimum image point O is a position of an image point at which the light beam has the smallest beam diameter.

In the following, explained is the focal point dislocation of the light beam in a lens inner peripheral section and a lens outer peripheral section where the spherical aberration is generated in the optical system of the optical pickup apparatus 10.

To begin with, when no spherical aberration is generated in the light beam, as shown in FIG. 5a, the light beam is converged in one point (focal point) on the optical axis OZ.

On the other hand, when the spherical aberration is generated in the light beam, as shown in FIG. 5b, a focal point A is located in a position beyond the best image point O on the optical axis OZ with respect to the lens outer peripheral section, while a focal point B is located in a position closer than the optimum image point O with respect to the lens inner peripheral section, which is closer to the optical axis OZ.

Therefore, as shown in FIG. 5b, an amount of the focal point dislocation in the case where the spherical aberration is generated in the light beam is indicated by a distance a from the optimum image point O to the focal point A, or a distance b from the optimum image point O to the focal point B.

Therefore, when the spherical aberration is generated in the light beam, it is necessary to converge the light beam, which has been separated, onto the optimum image point O for highly accurate detection of the focal point dislocation without the generation of the offset.

Figure 6:
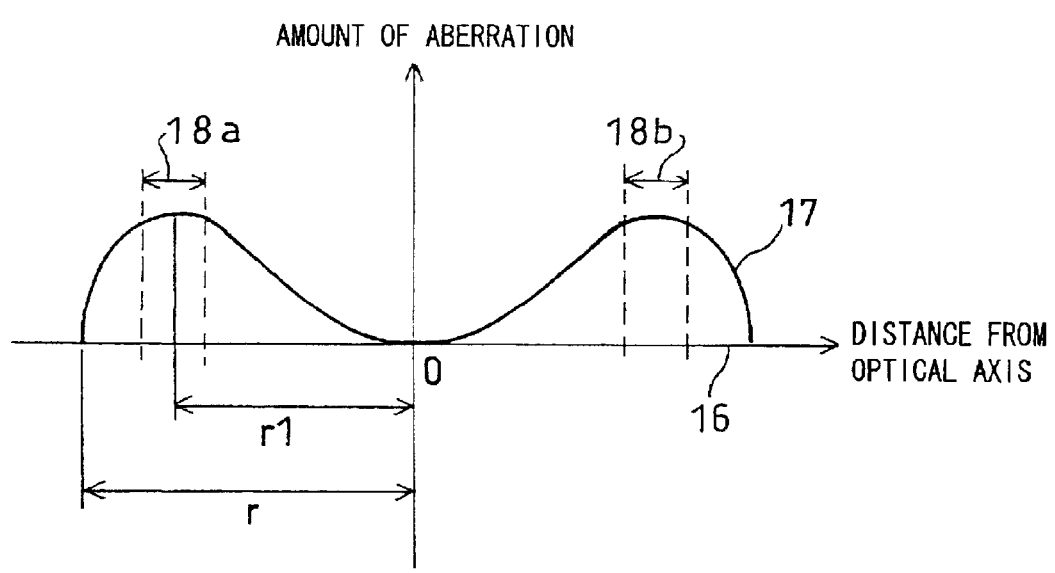
FIG. 6 is a conceptual view illustrating a wavefront aberration when the spherical aberration is generated.

Here, the detection of the focal point dislocation without the generation of the offset is discussed in terms of the wavefront of the light beam. FIG. 6 illustrates a wavefront aberration of the case where the spherical aberration is generated as shown in FIG. 5b. Moreover, as a curve symmetrical with respect to the optical axis, illustrated is a wavefront 17 of a case where the light beam forms the optimum image point on the information recording layer of the optical disc 6 when the spherical aberration is generated.

Here, in regions 18a and 18b, the wavefront has inclination that substantially matches with an inclination of an ideal wavefront 16. For this reason, a light beam included in the regions 18a and 18b is directed to a same direction as the ideal wavefront 16, thereby forming a focal point in a position which is substantially identical with that of the case where no spherical aberration is generated. Therefore, by using the light beam included in the regions 18a and 18b, it is possible to carry out the detection of the focal point dislocation without being largely affected by the spherical aberration.

Figure 7:
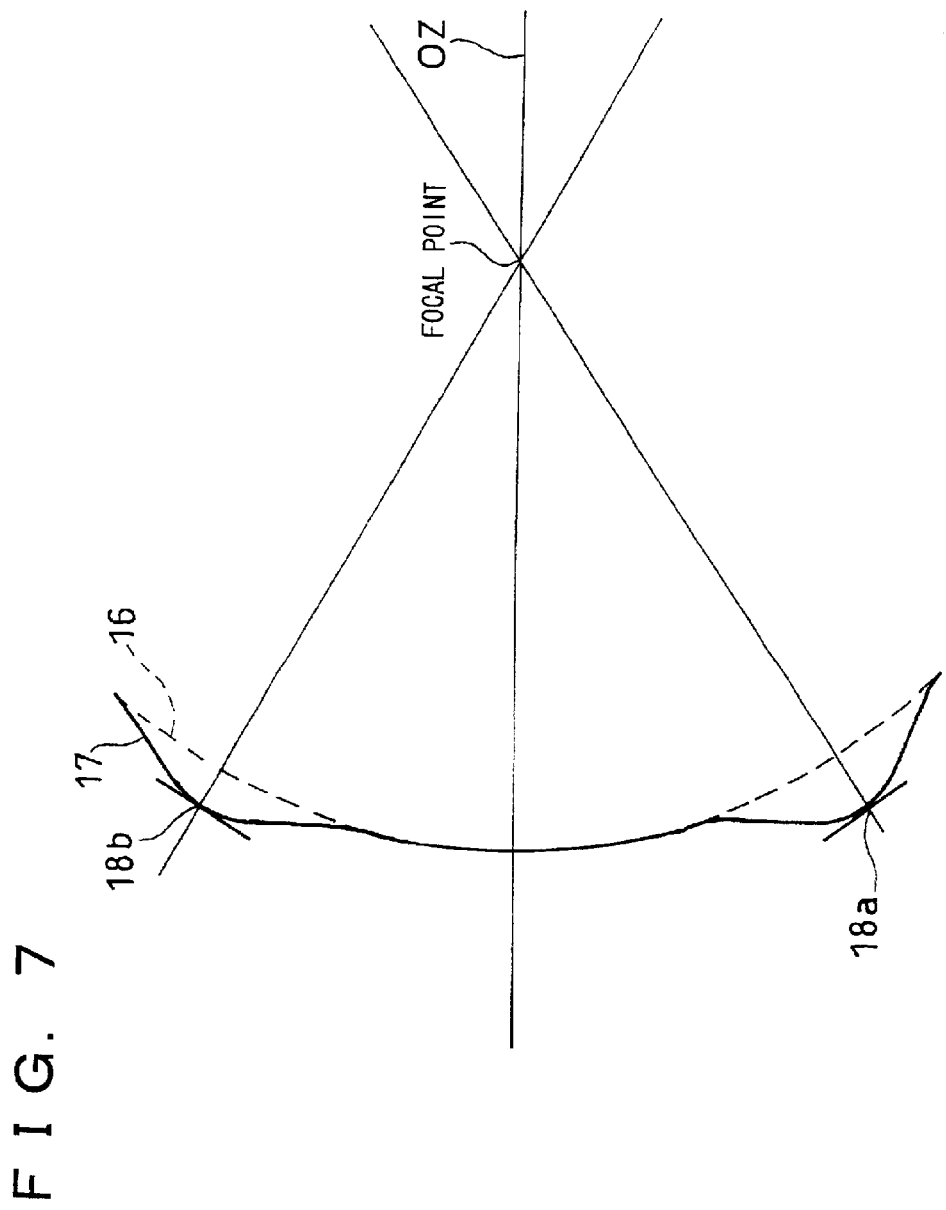
FIG. 7 is an explanatory view showing a focal point position when no spherical aberration is generated, and a focal point position of an extreme value of a wavefront when the spherical aberration is generated.

More specifically, as shown in FIG. 7, the focal point of the ideal wavefront 16 having no spherical aberration is in the position that is matched with the position of the focal point of extreme values of the regions 18a and 18b, which are boundary of the wavefront 17 having the spherical aberration. Therefore, the position of the focal point is detected in accordance with the light beam that corresponds to the regions 18a and 18b, which are regions of the extreme value of the wavefront 17 having the spherical aberration or in a vicinity of the extreme value. In this way, it is possible to detect the focal point dislocation without being significantly affected by the spherical aberration, because dislocation of the focal point position (the optimum image point O) of the optical pickup apparatus 10 is coincident with dislocation of the focal point position of the extreme value.

Next, discussed is determination where the regions 18a and 18b are located. The regions 18a and 18b includes the extreme value of the wavefront 17 and the vicinity of the extreme value. In general, aberration analysis of the wavefront is carried out by fitting a shape of the wavefront approximately in a Zernike polynomial in accordance with the least squares method so as to determine a third-order aberration from a coefficient of the polynomial. When the wavefront 17 shown in FIG. 6 is fitted approximately in the Zernike polynomial in accordance with the least squares method, dominant is a term of an equation: $6q^4-6q^2+1$ (where q is a distance from a center of the beam normalized by the light beam effective diameter). By using the equation, the extreme value of the wavefront 17 is determined so as to find the positions of the regions 18a and 18b. Thus, a relationship between (a) a distance r1 from the optical axis OZ to the extreme value of the wavefront 17 in FIG. 6 and (b) an light beam effective diameter r satisfies approximately an equation (7) as follows:

$$r1=0.7r \tag{7}$$

In short, approximately, 70% of the light beam effective diameter is the extreme value of the wavefront 17.

Figure 8:
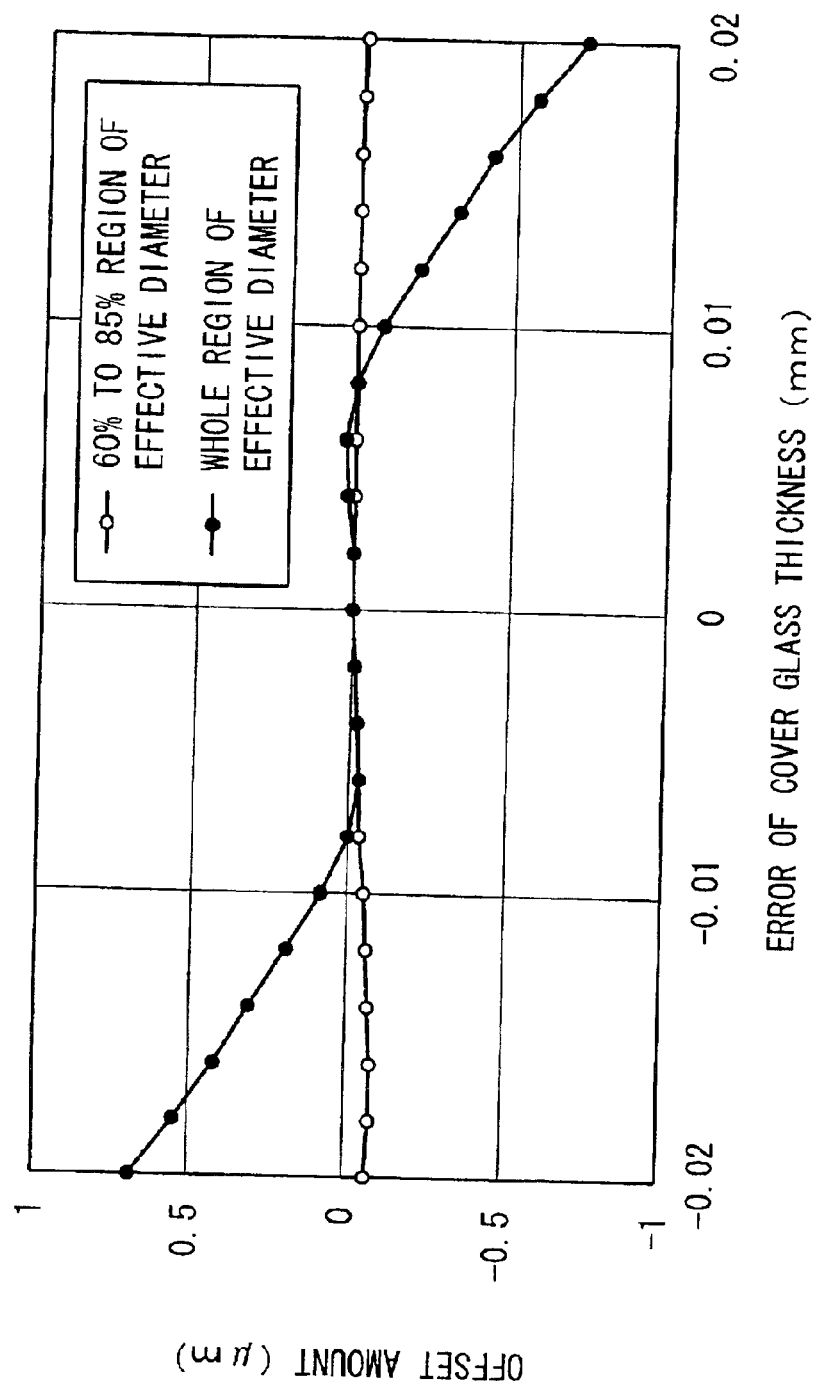
FIG. 8 is a graph illustrating a relationship between an amount of an offset and an error of a thickness of a cover glass, when the focus error signal FES is detected as a result of a change in a light beam effective diameter.

In FIG. 8, there are illustrated are results of calculations of (a) an amount of the offset of the focus error signal when the focal point dislocation is detected by using a 60% to 85% region of the light beam effective diameter in case the spherical aberration is generated as a result of the change in the thickness of the cover glass 6a of the optical disc 6, and (b) an amount of the offset of the focus error signal detected by using the whole region of the light beam effective diameter, as the equation (6).

Here, the optimum image point is inclined to the focal point position of a light beam outer periphery as an amount of the spherical aberration is increased. Thus, a region having more or equal to 70% of the light beam effective diameter has a larger share in a region set in the calculations, compared with a region having less or equal to 70% of the light beam effective diameter.

Moreover, even in case the spherical aberration is generated due to the thickness of the cover glass changed from 100 μm by ±20 μm where the calculation is carried out assuming that the numerical aperture of the coupling objective lens 9 is 0.85, the detection of the focal point dislocation in the region in the vicinity of the 70% of the light beam effective diameter shows that the focus error signal FES has almost no offset.

In the optical pickup apparatus 10, the detection of the focal point dislocation of the light beam in the vicinity of the 70% light beam effective diameter may be performed as follows. A diameter of the second circular arc E2 of the hologram 2 is enlarged to be larger than 70% of the light beam effective diameter, while having a diameter of the third circular arc E3 of the hologram 2 smaller than 70% of the light beam effective diameter. In this way, the second region 2b is designed in the region in the vicinity of the 70% of the light beam effective diameter, so that the second light beam directed from the second region 2b is utilized for the detection of the focal point dislocation of the light beam in the vicinity of the 70% light beam effective diameter. Here, the second focus error signal F2 is the focus error signal FES of the coupling objective lens 9.

The rest of the focus error signals F1 and F3 may be used for detecting the spherical aberration. Because in the first focus error signal F1 and the third focus error signal F3, generated is an offset that corresponds to the amount of the spherical aberration, it is possible to detect the spherical aberration from the value of the focus error signals F1 and F3. Thus, the spherical aberration error signal SAES is generated satisfying either of the following equations:

$$SAES=F1 \tag{8}$$

or $$SAES=F3 \tag{9}$$

By the way, the generation of the focal point dislocation changes the value of the spherical aberration error signal SAES, thereby making it impossible to detect the spherical aberration accurately. While the equations (8) and (9) may be used for obtaining the spherical aberration error signal SAES when a focus servo is applied, the following equations (10) and (11) may be applied for obtaining the spherical aberration error signal SAES if the spherical aberration is detected without a significant effect of the focal point dislocation:

$$SAES=F1-F2\times K1 \quad (K1 \text{ is a coefficient}) \tag{10}$$

or $$SAES=F3-F2-K2 \quad (K2 \text{ is a coefficient}) \tag{11}$$

where the coefficients K1 and K2 are so set as to make the change of the SAES small even if the focal point is dislocated. In case the focus servo is considered, it is passible to set the coefficients K1 and K2 so as to stabilize the value of the SAES within a range where the focal point dislocation is small.

Furthermore, it is possible to obtain the spherical aberration error signal SAES by an equation (12) shown below:

$$SAES = F3 - F1 \times K3 \text{ (K3 is a coefficient)} \qquad (12),$$

where the coefficient K3 is a coefficient for compensating an output difference between the first focus error signal F1 and the third focus error signal F3.

It should be noted that the present invention is not limited to the present embodiment where the hologram 2 is used as the means for directing to the detector 7 the light beam reflected from the information recording layer of the optical disc 6. However, the use of the hologram is preferable, with a view of miniaturizing the apparatus.

Figure 9:
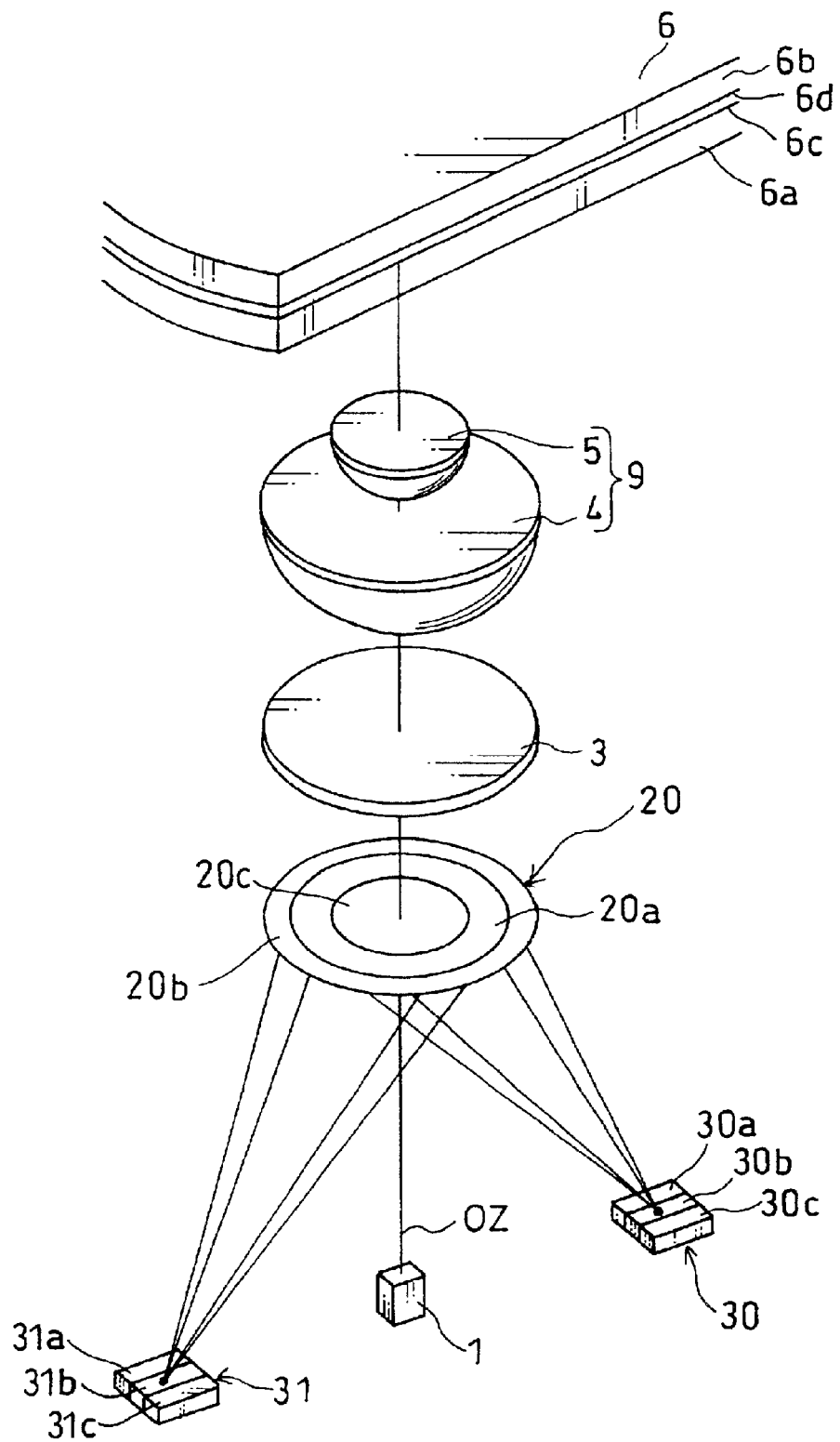
FIG. 9 is a schematic diagram of another optical pickup apparatus of the present invention.

Moreover, while the present embodiment utilizes the knife-edge method for detecting the focal point dislocation, it is also possible to employ the beam-size method by using a hologram 20 having divided pattern shown in FIG. 9, instead of the hologram 2 shown in FIG. 1, in order to carry out the detection of the focal point dislocation without the generation of the offset in a similar manner. The beam-size method, using the hologram 20, detects a change in the beam size of± first-order light that is diffracted in a region 20a of the hologram 20, so as to detect the focal point dislocation.

As to the optical pickup apparatus shown in FIG. 9, the focus error signal FES is generated by the following equation (13):

$$FES = \{30bS - (30aS + 30cS)\} - \{31bS - (31aS + 31cS)\} \qquad \ldots (13),$$

using outputs 30aS to 30cS, and 31aS through 31cS respectively outputted from photodetectors 30a to 30c, and 31a through 31c, where the photodetectors 30a to 30c constitutes a detector 30, while the photodetectors 31a through 31c constitutes a detector 31.

Furthermore, for the sake of the detection of the spherical aberration, it is also possible to carry out the detection of the focal point dislocation by detecting diffracted light from a region 20b and a region 20c of the hologram 20, where the region 20b locates out of a periphery of the region 20a, while the region 20c is in a position in the periphery of the region 20a. The detection of the diffracted light from the regions 20b and 20c is carried out in a similar manner to the detection of the diffracted light from the region 20a. However, an explanation on this method is omitted here.

In the present embodiment, as shown in FIG. 1, the hologram 2 is divided by the circle or the circular arc.

However, in reality, the optical pickup apparatus carries out the tracking control, in which the coupling objective lens 9 is moved in the radial direction (radius direction) of the optical disc 6 so as to converge the light beam on the track formed on the information recording layer of the optical disc 6 so that the light beam can be always converged on the track.

The tracking control is carried out without causing any problem, if the hologram 2 and the coupling objective lens 9 are manufactured integrally. However, if the optical pickup apparatus is provided with the hologram 2 and the coupling objective lens 9 separately, a center of the light beam does not match with a center of the hologram 2 because of the tracking control.

Here, if the hologram 2 has such a shape as shown in FIG. 1, diffraction of a part of the light beam is carried out in a region not for the diffraction of the part of the light beam, but not in the region to diffract the part of the light beam. Because of this, the electric signal from each photodetector is different, depending on whether the center of the light beam and the center of the hologram 2 are matched each other, or not. This changes the respective error signals, which are generated for controlling the respective photodetectors.

Figure 10:
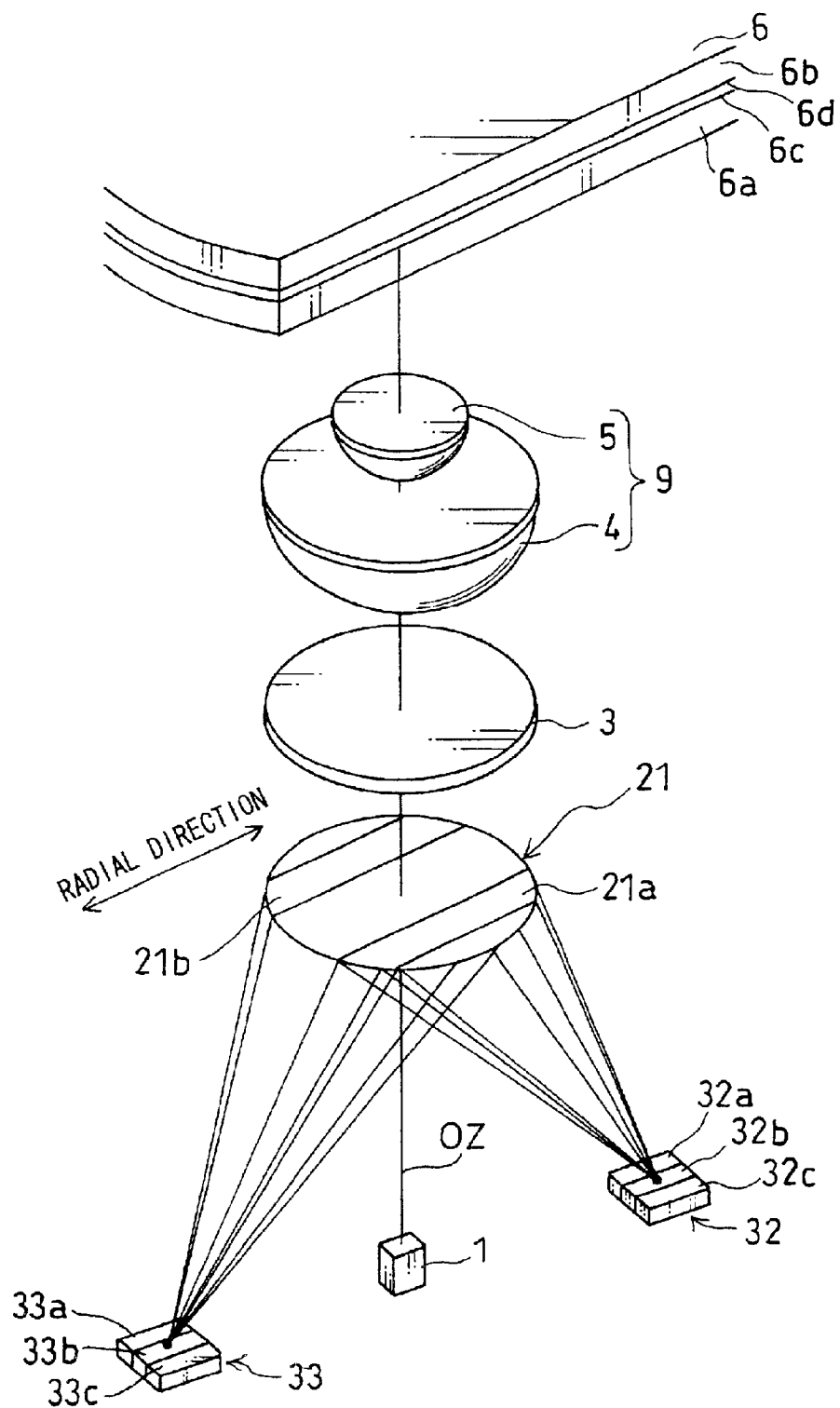
FIG. 10 is a schematic diagram of a still another optical pickup apparatus of the present invention.

Thus, instead of the hologram 2 shown in FIG. 1, a hologram 21 shown in FIG. 10 may be used. The hologram 21 is composed of regions 21a and 21b, which are divided by a straight line parallel with the radial direction. The change in the beam size is detected when ±first-order lights from the regions 21a and 21b are converged respectively onto a same point, so as to detect the focal point dislocation of the coupling objective lens as the converging optical system.

In this case, the regions 21a and 21b are so designed as to diffract the light beam of a 70% region of the light beam effective diameter and a region in its vicinity. A focus error signal FES of this case may satisfies an equation (14), using output signal 32aS to 32cS and 33aS through 33cS, which are respectively outputted from photodetectors 32a to 32c and 33a through 33c:

$$FES = \{32bS - (32aS + 32cS)\} - \{33bS - (33aS + 33cS)\} \qquad (14),$$

where the photodetectors 32a to 32c constitute a detector 32, while the photodetectors 33a to 33c structure a detector 33.

When the straight line dividing the regions in the hologram 21 is as shown in FIG. 10, the movement of the coupling objective lens 9 in the radial direction of the optical disc 6 for the tracking control does not change the region in which the light beam is diffracted. Therefore, a light beam passing through a same region always makes a focal point in a same light-receiving section. Thus, the tracking control does not change the focus error signal and the like.

Moreover, the use of the optical pickup apparatus of the present embodiment makes it possible to detect accurately the focal point dislocation even if the thickness of the cover glass 6a of the optical disc 6 is significantly changed. This makes it possible to form the focal points in the respective information recording layers in the recording medium having the plural information recording layers.

Moreover, in the present embodiment, the objective lens 9 is the coupling objective lens composed of the first lens element 4 and the second lens element 5. However, the objective lens 9 may be constituted with a single lens for the sake of simplifying assembly of the apparatus.

Furthermore, in the present embodiment, the compensation of the focal point dislocation is carried out by changing the distance between the coupling objective lens 9 and the optical disc 6, in accordance with the focus error signal FES that has been detected by the detection method discussed above. The spherical aberration may be compensated by changing the distance between the first lens element 4 and the second lens element 5 that structure the coupling objective lens 9. However, the present invention is not limited to this arrangement. For example, the collimator lens 3 may be moved so as to adjust a distance between the semiconductor 1 and the collimator lens 3.

Moreover, the spherical aberration compensation system may be inserted between the coupling objective lens 9 and the collimator lens 3. The spherical aberration compensation system structures an optical system that generates the spherical aberration when the light beam passes the spherical aberration compensation system.

For example, an afocal optical system, in which a convex lens having a positive power and a concave lens having a negative power are assembled together, may be used as the spherical aberration compensation system. The spherical aberration can be generated by adjusting a distance between the two lens. Further, the spherical aberration compensation system may have another arrangement, in which an afocal optical system in which two convex lenses having a positive power are assembled together. Furthermore, a liquid crystal panel is another option for the spherical aberration compensation system that generates the spherical aberration.

In the spherical aberration compensation methods discussed above, the spherical aberration is compensated by generating spherical aberration that cancels out the spherical aberration generated in the converging optical system. However, for example, if the spherical aberration compensation system has two lenses, it is possible to move the lenses in a direction so as to increase the spherical aberration (moving the lens in the direction makes the spherical aberration larger), when most suitable positions for the spherical aberration compensation lenses are searched. Here, if adopted is the method in which the light beam of the whole region of the light beam effective diameter is used for the detection of the focal point dislocation, the offset is caused in the focus error signal, thereby failing to minimize the light beam diameter on the information recording layer, so that a recording or reproducing signal is deteriorated.

However, with the above-mentioned detection method, the focal point dislocation is detected without the generation of the offset in the focus error signal FES even if the amount of the spherical aberration is changed to some extent. Thus, it is possible to form the optimum image point of the light beam always in the respective information recording layer of the optical disc 6 having the plural information recording layers, thereby preventing the recording or reproducing signal from being deteriorated.

A focal point dislocation detection method of the present invention includes the step of detecting focal point dislocation of a converging optical system in accordance with, among light beams that has passed through the converging optical system, a light beam that corresponds to an extreme value of a curve and a region in a vicinity of the extreme value, where the curve represents a wavefront of such a state that the converging optical system is so adjusted to have an image point at which the light beam has a smallest beam diameter.

In this case, when the curve represents a wavefront of such a state that the converging optical system is so adjusted to have the optimum image point, the tangent line at the extreme value of the curve is approximately parallel with a tangent line at the extreme value of the curve representing the ideal wavefront, which is free from the spherical aberration. This explains that the light beam, which passes through the extreme value of the curve representing the wavefront of the case where the light beam has the optimum image point on the information recording layer of the optical recording medium, has a convergent point (focal point) that is approximately matched with the optimum image point.

Therefore, even if the spherical aberration is generated, by performing, as the above arrangement, the detection of the focal point dislocation of a converging optical system in accordance with, among light beams that have passed through the converging optical system, a light beam that corresponds to an extreme value of a curve and a region in a vicinity of the extreme value, where the curve represents the wavefront of the state that the converging optical system is so adjusted to have the image point at which the light beam has the smallest beam diameter, it is possible to accurately detect the focal point dislocation without being significantly affected by the spherical aberration.

Because this makes it possible to optically detect the focal point dislocation of the converging optical system without the offset, the focal point dislocation of the converging optical system can be appropriately compensated, thereby performing accurate focusing of the converging optical system, while forming the focal point on the information recording layer of the optical recording medium.

Moreover, another focal point dislocation detection method of the present invention includes the step of detecting focal point dislocation of a converging optical system in accordance with a light beam of a 60% to 85% region of a light beam effective diameter, where the light beam effective diameter, which is centered with respect to an optical axis of the light beam passing through the converging optical system including an objective lens, is regulated by an aperture diameter of the objective lens.

This arrangement approximately matches (a) the optimum image point of the light beam that has passed through the converging optical system with (b) the convergent point (focal point) of the light beam of the 60% to 85% region of the light beam effective diameter, where the light beam effective diameter, which is centered with respect to the optical axis of the light beam passing through the converging optical system including the objective lens, is regulated by the aperture diameter of the objective lens.

Therefore, even if the spherical aberration is generated in the converging optical system, it is possible to accurately detect the focal point dislocation without being significantly affected by the spherical aberration, when, as the above arrangement, the detection of the focal point dislocation of the converging optical system is performed in accordance with the light beam of the 60% to 85% region of the light beam effective diameter, where the light beam effective diameter, which is centered with respect to the optical axis of the light beam passing through the converging optical system including the objective lens, is regulated by the aperture diameter of the objective lens.

Because this realizes the optical detection of the focal point dislocation of the converging optical system, the focal point dislocation of the converging optical system can be appropriately compensated, thereby accurately forming the focus point of the converging optical system on the information recording layer of the optical recording medium.

The focal point dislocation detection method of the present invention may be so arranged to include the step of detecting the focal point dislocation of the converging optical system in accordance with a first focus error signal, which indicates the focal point dislocation of the converging optical system, where the first focus error signal is generated by (1) separating, out of the light beams passing through the converging optical system, the light beam of the 60% to 85% region of the light beam effective diameter that is regulated by the aperture diameter of the objective lens, and (2) converting the separated light beam electrically.

With this arrangement, where the first focus error signal, which is generated by electrically converting the light beam separated from the light beams that have passed through the converging optical system, so as to carry out the detection in accordance with the first focus error signal, it is possible to detect the focal point dislocation of the converging optical system by using the electric signal.

Because the thus-obtained electric signal can be used in the driving circuits for driving and controlling the converging optical system, the focal point dislocation can be easily compensated by driving the converging optical system to an appropriate position.

The focal point dislocation detection method of the present invention may be so arranged that the separated light beam is obtained by passing a light beam, which has passed the converging optical system, through a light separating region, which is surrounded by a first circle or circular arc and a second circle or circular arc, where the first circle has a diameter larger than a diameter equivalent with 85% of the light beam effective diameter that is regulated by the aperture diameter is centered with respect to the optical axis of the light beam passing through the converging optical system, and where the second circle or circular arc has a diameter smaller than a diameter equivalent with 60% of the light beam effective diameter regulated by the aperture diameter of the objective lens.

In this case, the light beam necessary for the detection of the focal point dislocation of the converging optical system can be easily obtained by using the light separating region surrounded by the first circle or circular arc and the second circle or circular arc, where the first circle has the diameter larger than the diameter equivalent with 85% of the light beam effective diameter that is regulated by the aperture diameter and is centered with respect to the optical axis of the light beam passing through the converging optical system, and where the second circle or circular arc has the diameter smaller than the diameter equivalent with 60% of the light beam effective diameter regulated by the aperture diameter of the objective lens.

The focal point dislocation detection method of the present invention may be so arranged to include the step of detecting spherical aberration of the converting optical system in accordance with at least one of a second focus error signal and a third focus error signal, where the second focus error signal is obtained by detecting focal point dislocation of a light beam that passes a region inside the second circle or circular arc, and where the third focus error signal is obtained by detecting focal point dislocation of a light beam that passes a region outside the first circle or circular arc.

In this case, as discussed above, without being affected by the spherical aberration, the optimum image point is matched by the light beam, which passes the region surrounded by the first circle or circular arc and the second circle or circular arc, where the first circle has the diameter larger than the diameter equivalent with 85% of the light beam effective diameter that is regulated by the aperture diameter and is centered with respect to the optical axis of the light beam passing through the converging optical system, and where the second circle or circular arc has the diameter smaller than the diameter equivalent with 60% of the light beam effective diameter regulated by the aperture diameter of the objective lens.

Therefore, the spherical aberration affects the second focus error signal and the third focus error signal, where the second focus error signal is obtained by detecting the focal point dislocation of the light beam that passes the region inside the second circle or circular arc, and where the third focus error signal is obtained by detecting the focal point dislocation of the light beam that passes the region outside the first circle or circular arc.

Thus, it is possible to accurately detect the spherical aberration of the converging optical system by using at least one of the second focus error signal and the third focus error signal.

It is also possible that a spherical aberration error signal SAES, which indicates spherical aberration generated in the converging optical system, satisfies:

$SAES = F2 - F1 \times K1$ ($K1$ is a coefficient)

or $SAES = F3 - F1 \times K2$ ($K2$ is a coefficient), where F1 is the first focus error signal, which indicates the focal point dislocation of the converging optical system, F2 is the second focus error signal, and F3 is the third focus error signal.

In this case, the spherical aberration can be detected without being largely affected by the focal point dislocation because the first focus error signal, which is for the detecting the focal point dislocation of the converging optical system, is considered with respect to the second and the third focus error signals for the detection of the spherical aberration of the converging optical system.

Furthermore, an optical pickup apparatus of the present invention may be provided with (a) a light source, (b) a converging optical system for converging, onto a recording medium, a light beam emitted from the light source, (c) focal point dislocation detecting means for detecting focal point dislocation of the converging optical system in accordance with, among light beams that have passed through the converging optical system, a light beam that corresponds to an extreme value of a curve and a region in a vicinity of the extreme value, where the curve represents a wavefront of such a state that an image point, at which the light beam has a smallest beam diameter, is formed on an information recording layer of an optical recording medium.

When the curve represents the wavefront of the case where the light beam has the optimum image point on the information recording layer of the optical recording medium, the curve has such a tangent line that the tangent line is approximately parallel to the tangent line at the extreme value of the curve of the ideal wavefront without the spherical aberration. This indicates that the optimum image point is approximately matched with the convergent point (focal point) at which converged is the light beam, which passes through the extreme value of the curve that represents the wavefront of the case the light beam has the optimum image point on the information recording layer of the optical recording medium.

Therefore, even if the spherical aberration is generated in the converging optical system, it is possible to optically detect the focal point dislocation of the converging optical system without the offset by performing, as the above arrangement, the detection of the focal point dislocation of the converging optical system in accordance with, among light beams that have passed through the converging optical system, the light beam that corresponds to the extreme value of the curve and the region in the vicinity of the extreme value, where the curve represents the wavefront of the state that the optimum image point is formed on an information recording layer of the optical recording medium.

This makes it possible to appropriately compensate the focal point dislocation of the converging optical system without being affected by the spherical aberration. Because of this, the focal point of the converging optical system is accurately located on the information recording layer of the optical recording medium, thereby excellently performing the recording/reproducing of the information to/from the optical recording medium all the time.

Another optical pickup apparatus of the present invention is provided with (a) a light source, (b) a converging optical system, including an objective lens for converging a light beam emitted from the light source onto an optical recording medium, and (c) focal point dislocation detecting means for detecting focal point dislocation of the converging optical system in accordance with a light beam of a 60% to 85% region of a light beam effective diameter, where the light beam effective diameter, which is centered with respect to an optical axis of the light beam passing through the converging optical system, is regulated by an aperture diameter of the objective lens.

Here, the optimum image point of the light beam, which has passed the converging optical system, approximately matches with the convergent point (focal point) at which the light beam of the 60% to 85% region of the light beam effective diameter, which is centered with respect to the optical axis of the light beam passing the converging optical system including the object lens, and which is regulated by the aperture diameter of the objective lens.

Therefore, even if the spherical aberration is generated in the converging optical system, it is possible to optically detect the focal point dislocation of the converging optical system without the offset, by performing the detection of the focal point dislocation of the converging optical system in accordance with the light beam of the 60% to 85% region of the light beam effective diameter, where the light beam effective diameter, which is centered with respect to the optical axis of the light beam passing through the converging optical system, is regulated by the aperture diameter of the objective lens.

Because this makes it possible to appropriately compensate the focal point dislocation of the converging optical system without being affected by the spherical aberration, the focal point of the converging optical system is accurately located on the information recording layer of the optical recording medium. As a result, the excellent recording/reproduction of information to/from the optical recording medium may be performed all the time.

The focal point dislocation detecting means may include (a) light beam separating means for separating, out of light beams passing the converging optical system, the light beam of the 60% to 85% region of the light beam effective diameter regulated by the aperture diameter of the objective lens, and (b) first signal generation means for generating a first focus error signal in accordance with the light beam separated by the light beam separating means, wherein the first focus error signal indicates focus point dislocation of the converging optical system.

In this case, the focal point dislocation of the converging optical system can be detected by using the electric signal, with the above arrangement where the first focus error signal, which indicates the focal point dislocation, is generated by electrically converting the light beam that is separated from the light beams that have passed the converging optical system.

Because the thus obtained electric signal can be used in the driving circuit for driving and controlling the converging optical system, the focal point dislocation can be easily compensated by driving the converging optical system to an appropriate position.

It may be so arranged that the light beam separating means includes a first light separating region, which is surrounded by a first circle or circular arc and a second circle or circular arc, where the first circle has a diameter larger than a diameter equivalent with 85% of the light beam effective diameter regulated by the aperture diameter of the objective lens, and is centered with respect to the optical axis of the light beam passing through the converging optical system, and where the second circle or circular arc has a diameter smaller than a diameter equivalent with 60% of the light beam effective diameter regulated by the aperture diameter of the objective lens, wherein the first signal generating means generates the first focus error signal in accordance with a light beam that passes through the first light separating region of the light beam separating means.

In this case, the light beam necessary for the detection of the focal point dislocation of the converging optical system can be easily separated by using the light beam separating means that includes the first light separating region, which is surrounded by the first circle or circular arc and the second circle or circular arc, where the first circle has the diameter larger than the diameter equivalent with 85% of the light beam effective diameter regulated by the aperture diameter of the objective lens, and is centered with respect to the optical axis of the light beam passing through the converging optical system, and where the second circle or circular arc has the diameter smaller than the diameter equivalent with 60% of the light beam effective diameter regulated by the aperture diameter of the objective lens.

Furthermore, the optical pickup apparatus of the present invention may be provided with (a) second signal generating means for generating a second focus error signal by detecting focal point dislocation of a light beam passing through a region inside the second circle or circular arc of the light beam separating means, (b) third signal generating means for generating a third focus error signal by detecting focal point dislocation of a light beam passing through a region outside the first circle or circular arc, (c) spherical aberration detecting means for detecting spherical aberration of the converging optical system in accordance with at least one of the second and third focus error signals.

In this case, as discussed above, the spherical aberration does not affect the matching between (a) the optimum image point and (b) the light beam that passes through the region surrounded by the first circle or circular arc and the second circle or circular arc, where the first circle has the diameter larger than the diameter equivalent with 85% of the light beam effective diameter regulated by the aperture diameter of the objective lens, and is centered with respect to the optical axis of the light beam passing through the converging optical system, and where the second circle or circular arc has the diameter smaller than the diameter equivalent with 60% of the light beam effective diameter regulated by the aperture diameter of the objective lens.

Therefore, the spherical aberration affects the second focus error signal obtained by detecting the focal point dislocation of the light beam passing through the region inside the second circle or circular arc of the light beam separating means, and the third focus error signal obtained by detecting the focal point dislocation of the light beam passing through the region outside the first circle or circular arc, because those regions are out of the region that allows the light beam to match with the optimum image point.

By doing this, the spherical aberration of the converging optical system can be accurately detected by using any one of the second focus error signal and the third focus error signal.

It may be so arranged that the spherical aberration detecting means determines a spherical aberration error signal SAES, which indicates spherical aberration generated in the converging optical system, the spherical aberration error signal SAES satisfies:

$$SAES = F2 - F1 \times K1 \quad (K1 \text{ is a coefficient})$$

or $$SAES = F3 - F1 \times K2 \quad (K2 \text{ is a coefficient})$$

where F1 is the first focus error signal, which indicates the focal point dislocation of the converging optical system, F2 is th e second focus error signal, and F3 is the third focus error signal.

In this case, the spherical aberration can be detected without being largely affected by the focal point dislocation because the first focus error signal, which is for the detecting the focal point dislocation of the converging optical system, is considered with respect to the second and the third focus error signals for the detection of the spherical aberration of the converging optical system.

It may be so arranged that, in case the optical recording medium has a plurality of the information recording layers, the focal point dislocation detecting means detects the focal point dislocation in the respective information recording layers.

In this case, the focal point dislocation in each information recording layer can be accurately detected without the effect of the spherical aberration, even if the spherical aberration is generated due to the difference between the distances from (a) a surface of the optical recording medium where the incident light is directed onto to (b) the respective information recording layers.

Furthermore, the optical pickup apparatus of the present invention may be provided with (a) focal point dislocation compensating means for compensating the focal point dislocation of the converging optical system in accordance with a result of the detection carried out by the focal point dislocation detecting means, and (b) spherical aberration compensating means for compensating spherical aberration, which has been generated in the converging optical system, in accordance with a result of the detection carried out be the spherical aberration detecting means, wherein the spherical aberration compensating means compensate the spherical aberration of the converging optical system, whose focal point dislocation has been compensated by the focal point dislocation compensating means.

In this case, the spherical aberration may be compensated by the spherical aberration compensating means while maintaining the light beam diameter in the best condition on the information recording layer of the optical recording medium, because the spherical aberration of the converging optical system is compensated when the focal point dislocation compensating means compensates the focal point dislocation of the converging optical system.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An optical pickup apparatus, comprising:
    a light source;
    a converging optical system including an objective lens converging, onto an optical recording medium, a light beam emitted from the light source;
    a light beam separating means having three sections defined by a first circle or arc around an optical axis of a light beam reflected from an information recording layer of the optical recording medium and passing through the converging optical system, the first circle or arc having a diameter equal to or greater than a light beam effective diameter, a second circle or arc having a diameter smaller than that of the first circle or arc, but greater than 70% of the light beam effective diameter, and a third circle or arc having a diameter smaller than 70% of the light beam effective diameter;
    wherein a first section of the three sections is enclosed between the first circle or arc and the second circle or arc, a second section being enclosed between the second circle or arc and the third circle or arc, a third section being inside the third circle or arc;
    wherein the second section is divided into two sections, one of which where a diameter is greater than 70% of the light beam effective diameter is greater than the other where a diameter is smaller than 70% of the light beam effective diameter;
    a first signal generation means electrically converting a light beam separated by the second section into a first focal point error signal; and
    a focal point dislocation detecting means designating the first focal point error signal as a focal point dislocation signal representing a focal point dislocation in the converging optical system.

2. The optical pickup apparatus as set forth in claim 1, wherein, in case said optical recording medium has a plurality of said information recording layers, said focal point dislocation detecting means detects the focal point dislocation in said respective information recording layers.

3. The optical pickup apparatus as set forth in claim 1, wherein said light beam separating means is a hologram.

4. The optical pickup apparatus as set forth in claim 1, wherein:
    the converging optical system includes an objective lens for converging a light beam emitted from said light source onto an optical recording medium,
    the optical pickup apparatus comprising:
    (a) a light beam separating means having a region divided by a straight line parallel with a radial direction, the region separating, out of the light beams passing through said converging optical system, a light beam of a 70% region of a light beam effective diameter, regulated by a numerical aperture of said objective lens, and
    (b) a first signal generation means for generating a first focus error signal in accordance with the light beam separated by said light beam separating means,
    the first focus error signal indicating focus point dislocation of said converging optical system.

5. The optical pickup apparatus as set forth in claim 4, wherein said light beam separating means is a hologram.

6. The optical pickup apparatus as set forth in claim 1, wherein:
    the light beam separating means includes regions divided by a first straight line and a second straight line, the first straight line making a right angle with the optical axis, and the second straight line making a right angle with the straight line and a radial direction; and
    a tracking error signal of the converging optical system is detected in accordance with the light beam separated by the regions of the light beam separating means.

7. The optical pickup apparatus as set forth in claim 6, wherein said light beam separating means is a hologram.

8. The optical pickup apparatus as set forth in claim 1, wherein: the diameter of the second circle or arc is smaller than 85% of the light beam effective diameter; and
    the diameter of the third circle or arc is greater than 60% of the light beam effective diameter.

9. The optical pickup apparatus as set forth in claim 8, wherein the focal point dislocation detecting means detects a focal point dislocation based on a light beam of a section of a diameter 70% of the light beam effective diameter.

10. The optical pickup apparatus as set forth in claim 9, further comprising:
    a second signal generation means detecting a focal point dislocation of a light beam passing through the first section of the light beam separating means to generate a second focal point dislocation signal;
    third signal generation means detecting a focal point dislocation of a light beam passing through the third section of the light beam separating means to generate a third focal point dislocation signal; and wherein there is provided spherical aberration detection means obtaining a spherical aberration error signal SAES representing a spherical aberration in the converging optical system from equations:

$$SAES=F1-F2 \times K1 \text{ (K1 is a coefficient)}$$

$$SAES=F3-F2 \times K2 \text{ (K2 is a coefficient)}$$

$$SAES=F3-F1 \times F1 \text{ (K3 is a coefficient)}$$

where F1 is a second focal point error signal obtained by detecting a focal point dislocation of the light beam passing through the first section, F2 is the first focal point error signal obtained by detecting a focal point dislocation of a light beam passing through the second section, and F3 is a third focal point error signal obtained by detecting a focal point dislocation of the light beam passing through the third section.

11. The optical pickup apparatus as set forth in claim 10, comprising:

focal point dislocation compensating means for compensating the focal point dislocation of said converging optical system in accordance with a result of the detection carried out by said focal point dislocation detecting means; and spherical aberration compensating means for compensating spherical aberration, which has been generated in said converging optical system, in accordance with a result of the detection carried out be said spherical aberration detecting means, wherein said spherical aberration compensating means compensates the spherical aberration of said converging optical system, whose focal point dislocation has been compensated by said focal point dislocation compensating means.

12. A focal point dislocation detection method, comprising the steps of:

dividing a light beam reflected from an information recording layer of an optical recording medium and passing through a converging optical system including an objective lens into three sections by means of a first circle or arc, around an optical axis of the light beam, having a diameter equal to or greater than a light beam effective diameter, a second circle or arc having a diameter smaller than that of the fast circle or arc, but greater than 70% of the light beam effective diameter, and a third circle or arc having a diameter smaller than 70% of the light beam effective diameter, a first section of the three sections being enclosed between the first circle or arc and the second circle or arc, a second section being enclosed between the second circle or arc and the third circle or arc, a third section being inside the third circle or arc, the second section being divided into two sections, one of which where a diameter is greater than 70% of the light beam effective diameter is greater than the other where a diameter is smaller than 70% of the light beam effective diameter and electrically converting a light beam separated by the second section into a first focal point error signal which is designated as a focal point dislocation signal representing a focal point dislocation in the converging optical system.

13. The focal point dislocation detection method as set forth in claim 12, wherein:

the diameter of the second circle or arc is smaller than 85% of the light beam effective diameter; and the diameter of the third circle or arc is greater than 60% of the light beam effective diameter.

14. The focal point dislocation detection method as set forth in claim 13, wherein the focal point dislocation is detected based on a light beam of a section of a diameter 70% of the light beam effective diameter.

15. The focal point dislocation detection method as set forth in claim 14, wherein:

a spherical aberration error signal SAES representing a spherical aberration in the converging optical system is obtainable from equations:

$$SAES=F1-F2 \times K1 \text{ (K1 is a coefficient)}$$

$$SAES=F3-F2 \times K2 \text{ (K2 is a coefficient)}$$

$$SAES=F3-F1 \times K3 \text{ (K3 is a coefficient)}$$

where F1 is a second focal point error signal obtained by detecting a focal point dislocation of a light beam passing through the first section, F2 is the first focal point error signal obtained by detecting a focal point dislocation of a light beam passing through the second section, and F3 is a third focal point error signal obtained by detecting a focal point dislocation of a light beam passing through the third section.

16. The focal point dislocation detection method as set forth in claim 12, wherein the focal point dislocation is detected by a knife-edge method.

17. The focal point dislocation detection method as set forth in claim 12, wherein the focal point dislocation is detected by a beam-size method.

* * * * *